(12) United States Patent
Stuart

(10) Patent No.: US 10,209,023 B1
(45) Date of Patent: Feb. 19, 2019

(54) WEAPON REST

(71) Applicant: Richard Stuart, Bonne Terre, MO (US)

(72) Inventor: Richard Stuart, Bonne Terre, MO (US)

(*) Notice: Subject to any disclaimer, the term of this patent is extended or adjusted under 35 U.S.C. 154(b) by 0 days.

(21) Appl. No.: 15/854,950

(22) Filed: Dec. 27, 2017

(51) Int. Cl.
*F41A 23/18* (2006.01)
*B60R 7/14* (2006.01)
*A47B 81/00* (2006.01)

(52) U.S. Cl.
CPC .............. *F41A 23/18* (2013.01); *A47B 81/00* (2013.01); *B60R 7/14* (2013.01)

(58) Field of Classification Search
CPC .......... F41A 23/18; F41A 23/16; F41A 23/08; F41A 23/02; F41A 23/00; F41C 33/001
USPC ................................. 248/201; 42/94
See application file for complete search history.

(56) References Cited

U.S. PATENT DOCUMENTS

| | | | | |
|---|---|---|---|---|
| 2,988,311 A * | 6/1961 | Bow | ...................... | A01K 97/10 248/122.1 |
| 4,144,971 A * | 3/1979 | Balibrea | ................. | F41A 23/18 211/64 |
| 4,913,391 A | 4/1990 | Klipp | | |
| 4,936,415 A | 6/1990 | Williams | | |
| D314,469 S | 2/1991 | Chilcutt | | |
| 5,465,933 A | 11/1995 | Todd | | |
| 5,685,104 A * | 11/1997 | Breazeale, Jr. | ......... | F41A 23/02 248/287.1 |
| 6,032,911 A | 3/2000 | Osborne | | |
| 6,276,087 B1 | 8/2001 | Singletary | | |
| 6,302,052 B1 * | 10/2001 | Sauerwein | ............ | B63B 25/002 114/343 |
| 6,338,218 B1 * | 1/2002 | Hegler | .................... | F41A 23/02 42/94 |
| 6,588,637 B2 * | 7/2003 | Gates | ................... | A47B 81/005 211/64 |
| 6,898,893 B1 * | 5/2005 | Mukdaprakorn | ...... | A01K 97/10 248/518 |
| 7,021,423 B1 | 4/2006 | Pestrue et al. | | |
| 7,043,869 B1 * | 5/2006 | Hubbard | ................ | A01K 97/10 43/21.2 |
| 7,165,750 B2 | 1/2007 | McCuskey | | |
| 7,681,768 B2 * | 3/2010 | Gates | ...................... | B60R 11/00 224/401 |
| 7,784,813 B2 * | 8/2010 | Columbia | ................ | B60D 1/06 280/495 |
| 8,393,111 B1 * | 3/2013 | Johnson | ................. | A01K 97/08 211/70.8 |
| 8,534,519 B2 * | 9/2013 | Hancock | ................... | B60R 9/08 224/401 |
| 8,733,227 B1 | 5/2014 | Ridgeway et al. | | |
| 8,800,196 B2 * | 8/2014 | Baumann | ............... | A01K 97/10 248/534 |
| 9,163,893 B1 * | 10/2015 | Gutierrez | ................ | F41A 23/16 248/201 |
| 9,976,693 B1 * | 5/2018 | Delikat | ................... | F16M 11/14 |
| 9,987,993 B2 * | 6/2018 | Thorimbert | ............... | B60R 7/14 |
| 2011/0101192 A1 * | 5/2011 | Lee | ........................ | F16C 11/106 248/346.03 |

(Continued)

*Primary Examiner* — Nkeisha Smith

(57) ABSTRACT

A weapon rest for placing a weapon on includes a bar that is oriented horizontally. A plurality of mounts is releasably positioned on the bar in an upright position wherein a weapon is positionable across each of the mounts such that the weapon rest thereon.

4 Claims, 5 Drawing Sheets

(56) References Cited

U.S. PATENT DOCUMENTS

| | | | |
|---|---|---|---|
| 2012/0017485 A1* | 1/2012 | Kern | F41A 23/16 42/94 |
| 2017/0361776 A1* | 12/2017 | Thorimbert | B60R 7/14 |
| 2018/0058795 A1* | 3/2018 | Scott | F41A 23/34 |

* cited by examiner

WEAPON REST

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to weapon holding devices and more particularly pertains to a new weapon holding device for placing a weapon on.

BRIEF SUMMARY OF THE INVENTION

An embodiment of the disclosure meets the needs presented above by generally comprising a bar that is oriented horizontally. A plurality of mounts is releasably positioned on the bar in an upright position. A weapon is positioned across each of the mounts such that the weapon rest thereon.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
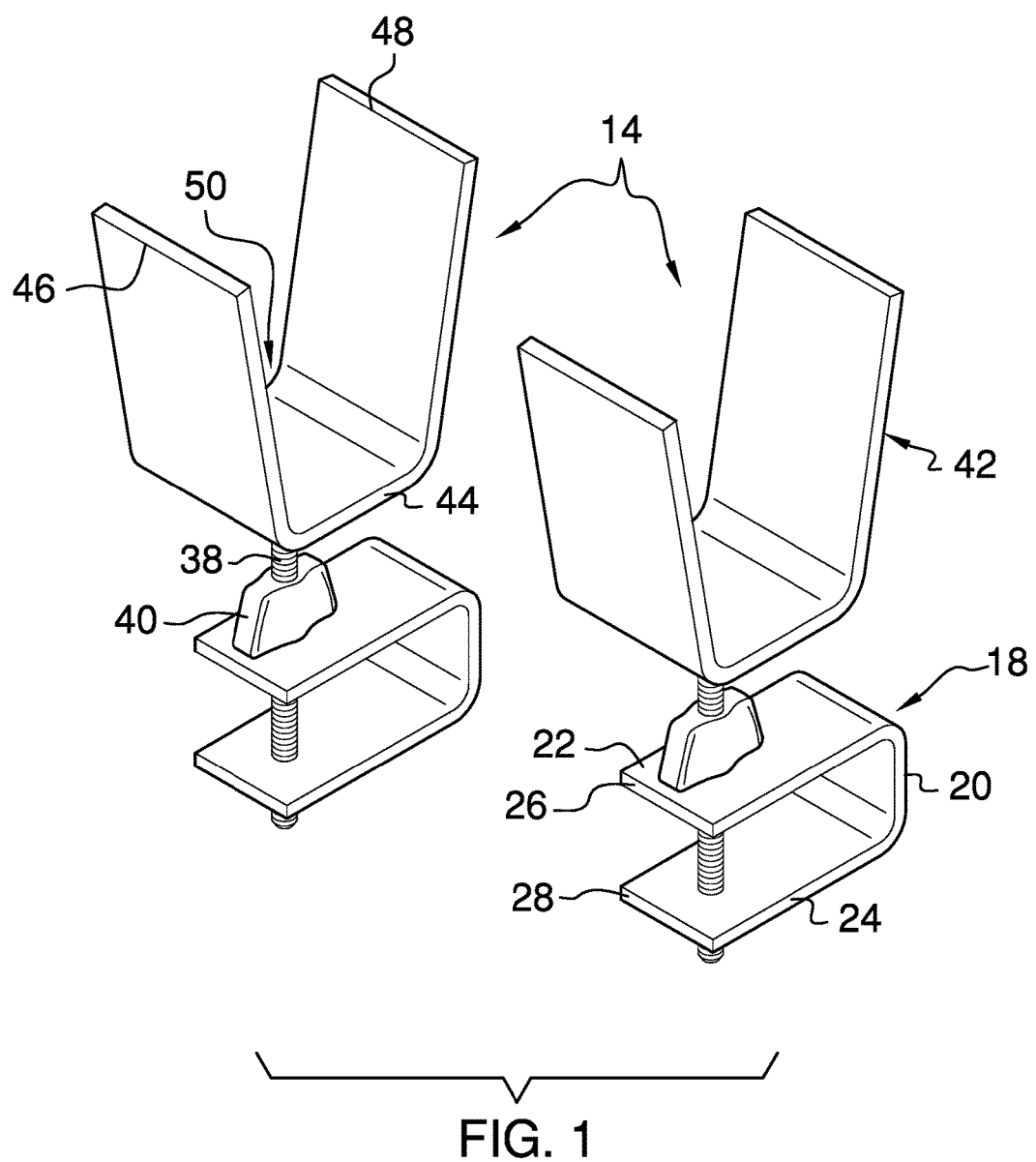
FIG. 1 is a top side view of a weapon rest according to an embodiment of the disclosure.
Figure 2:
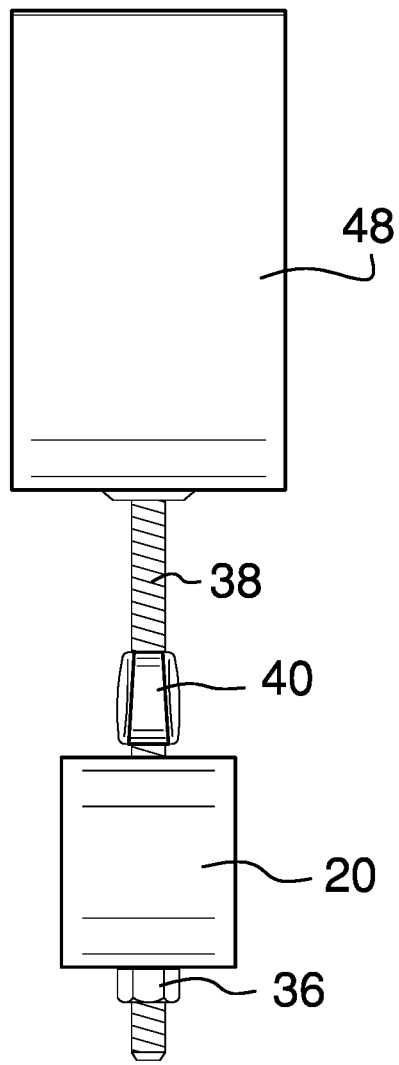
FIG. 2 is a side view of an embodiment of the disclosure.
Figure 3:
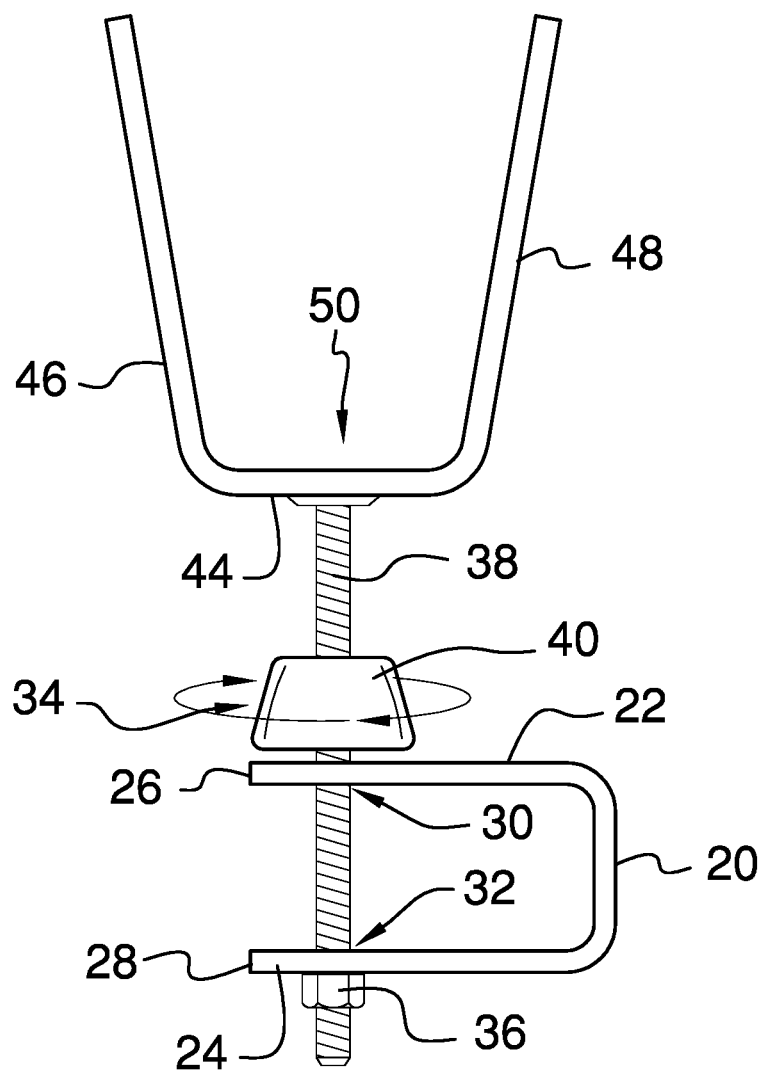
FIG. 3 is a front view of an embodiment of the disclosure.
Figure 4:
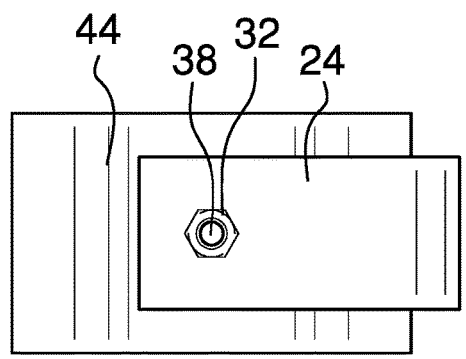
FIG. 4 is a bottom view of an embodiment of the disclosure.
Figure 5:
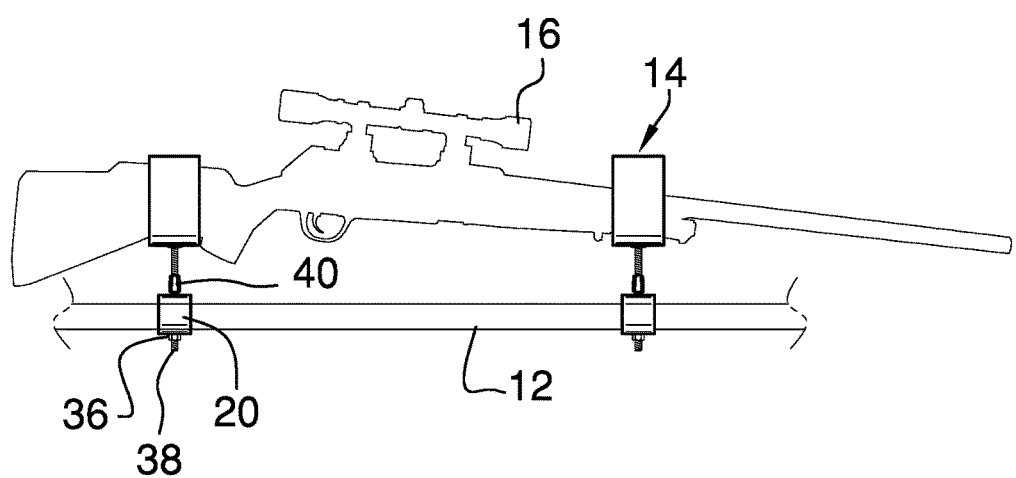
FIG. 5 is a side view of an embodiment of the disclosure.
Figure 6:
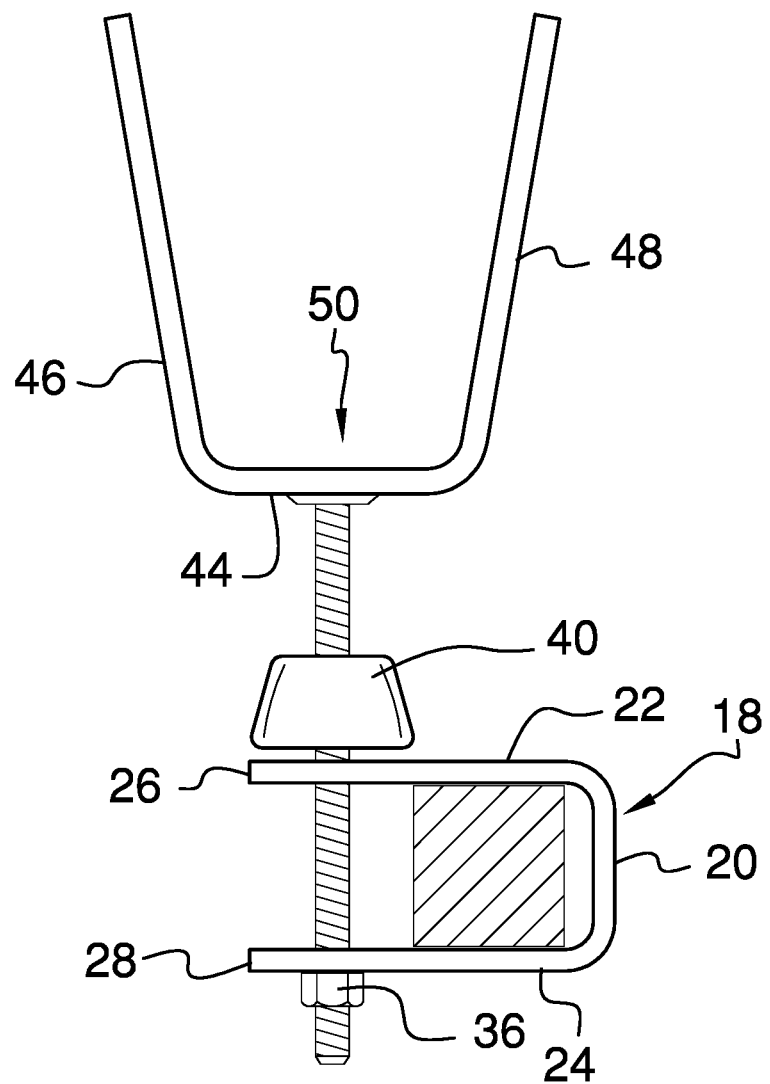
FIG. 6 is a front view of an embodiment of the disclosure.

With reference now to the drawings, and in particular to FIGS. 1 through 6 thereof, a new weapon holding device embodying the principles and concepts of an embodiment of the disclosure and generally designated by the reference numeral 10 will be described.

As best illustrated in FIGS. 1 through 6, the weapon rest 10 generally comprises a bar 12 that is oriented horizontally. A plurality of mounts 14 is releasably positioned on the bar 12 in an upright position. A weapon 16 is positioned across each of the mounts 14 such that the weapon 16 rest thereon. The bar 12 may include a conventional bar orientated horizontally, but may also include an armrest of a hunting chair or other horizontally orientated cylinder shaped devices. Additionally, weapon 16 may include any projectile based weapon such as a gun or a bow but does not necessarily need to be so.

Each of the mounts 14 comprises a bracket 18 that has a middle portion 20 that extends between a first outward portion 22 and a second outward portion 24. The first outward portion 22 and second outward portion 24 are spaced apart from each other such that the bracket 18 has a U-shape. The first outward portion 22 and the second outward portion 24 each have a distal end 26, 28 with respect to the middle portion 20. The bracket 18 is comprised of a bendable material. The first outward portion 22 has a first aperture 30 that extends therethrough. The first aperture 30 is positioned closer to the distal end 26 of the first portion than the middle portion 20. The second outward portion 24 has a second aperture 32 that extends therethrough and is aligned with the first aperture 30. The bar 12 is positioned between the first and second outward portions 22, 24 and is adjacent to the middle portion 20.

A securing assembly 34 is mounted on the bracket 18 and releasably retains the bracket 18 at a selected position on the bar 12. The securing assembly includes a fastener 36 that is attached to the second outward portion 24 and is aligned with the second aperture 30. A threaded rod 38 extends through the first and second apertures 30, 32 and is threadably coupled to the fastener 36. A knob 40 is threadably coupled to the threaded rod 38. The bracket 18 is positioned between the fastener 36 and the knob 40 wherein the knob 40 is selectively rotatable in a first direction to bias the first outward portion toward 22 the second outward portion 24 such that the bracket 18 frictionally engages the bar 12.

A saddle 42 is attached to the securing assembly 34 and extends upwardly therefrom. The saddle 42 has a middle section 44 that extends between a first section 46 and a second section 48. The first section 46 and the second section 48 are angle upwardly and outwardly away from the middle section 44 to define a receiving space 50. The receiving space 50 receives the weapon 16 thereon. The saddle 42 is oriented in an upright position when the bracket 18 frictionally engages the bar 12.

In use, each of the mounts 14 is attached to the bar 12 by placing the bar 12 between the first and second outward portions 22, 24 and rotating the knob 40 in the first direction. The saddle 42 is orientated upwardly from the bar 12 such that the receiving space 50 is exposed upwardly. The weapon 16 is laid across each of the receiving spaces 50 such that weapon 16 rest on the mounts 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A gun mounting system configured for resting a weapon thereon, said system comprising:
   a bar being oriented horizontally; and
   a plurality of mounts being releasably positioned on said bar in an upright position, each of said mounts being configured to have a weapon rest thereon, each of said mounts including:
   a bracket positioned on said bar, said bracket including a middle portion extending between a first outward portion and a second outward portion, said first outward portion and second outward portion being spaced apart from each other such that said bracket has a U-shape, said first outward portion and said second outward portion each having a distal end with respect to said middle portion, said bar being positioned between said first and second outward portions and adjacent to said middle portion, said first outward portion has a first aperture extending therethrough, said first aperture being positioned closer to said distal end of said first portion than said middle portion, said second outward portion having a second aperture extending therethrough, said second aperture being aligned with said first aperture;
   a securing assembly being mounted on said bracket and releasably retaining said bracket at a selected position on said bar, said securing assembly including
      a fastener being attached to said second outward portion, said fastener being aligned with said second aperture,
      a threaded rod extending through said first and second apertures and being threadably coupled to said fastener, and
      a knob being threadably coupled to said threaded rod, said bracket being positioned between said fastener and said knob, said knob being selectively rotatable in a first direction to bias said first outward portion toward said second outward portion such that said bracket frictionally engages said bar; and
   a saddle being attached to said securing assembly and extending upwardly therefrom.

2. The gun mounting system according to claim 1, wherein said bracket is comprised of a bendable material.

3. The gun mounting system according to claim 1, wherein said saddle having a middle section extending between a first section and a second section, said first section and said second section being angle upwardly and outwardly away from said middle section to define a receiving space, said receiving space being configured to receive the weapon thereon, said saddle being oriented in an upright position when said bracket frictionally engages said bar.

4. A gun mounting system configured for resting a weapon thereon, said system comprising:
   a bar being oriented horizontally;
   a plurality of mounts being releasably positioned on said bar in an upright position, each of said mounts being configured to have a weapon rest thereon, each of said mounts comprising:
   a bracket having a middle portion extending between a first outward portion and a second outward portion, said first outward portion and second outward portion being spaced apart from each other such that said bracket has a U-shape, said first outward portion and said second outward portion each having a distal end with respect to said middle portion, said bracket being comprised of a bendable material, said first outward portion having a first aperture extending therethrough, said first aperture being positioned closer to said distal end of said first portion than said middle portion, said second outward portion having a second aperture extending therethrough, said second aperture being aligned with said first aperture, said bar being positioned between said first and second outward portions and adjacent to said middle portion;
   a securing assembly being mounted on said bracket and releasably retaining said bracket at a selected position on said bar, said securing assembly including:
      a fastener being attached to said second outward portion, said fastener being aligned with said second aperture;
      a threaded rod extending through said first and second apertures and being threadably coupled to said fastener;
      a knob being threadably coupled to said threaded rod, said bracket being positioned between said fastener and said knob, said knob being selectively rotatable in a first direction to bias said first outward portion toward said second outward portion such that said bracket frictionally engages said bar; and
      a saddle being attached to said securing assembly and extending upwardly therefrom, said saddle having a middle section extending between a first section and a second section, said first section and said second section being angle upwardly and outwardly away from said middle section to define a receiving space, said receiving space being configured to receive the weapon thereon, said saddle being oriented in an upright position when said bracket frictionally engages said bar.

\* \* \* \* \*